(12) United States Patent
Iwanaga et al.

(10) Patent No.: US 11,251,428 B2
(45) Date of Patent: *Feb. 15, 2022

(54) POSITIVE ELECTRODE ACTIVE MATERIAL MANUFACTURING METHOD WITH CONTROL OF WASHING SLURRY LIQUID ELECTRICAL CONDUCTIVITY

(71) Applicants: SUMITOMO METAL MINING CO., LTD., Tokyo (JP); PANASONIC CORPORATION, Kadoma (JP)

(72) Inventors: Tomoko Iwanaga, Ehime (JP); Hideo Sasaoka, Ehime (JP); Satoshi Matsumoto, Ehime (JP); Yutaka Kawatate, Osaka (JP); Shinji Arimoto, Osaka (JP)

(73) Assignees: SUMITOMO METAL MINING CO., LTD., Tokyo (JP); PANASONIC CORPORATION, Osaka (JP)

(*) Notice: Subject to any disclaimer, the term of this patent is extended or adjusted under 35 U.S.C. 154(b) by 11 days.

This patent is subject to a terminal disclaimer.

(21) Appl. No.: 16/785,060

(22) Filed: Feb. 7, 2020

(65) Prior Publication Data

US 2020/0176773 A1  Jun. 4, 2020

Related U.S. Application Data

(62) Division of application No. 14/119,350, filed as application No. PCT/JP2012/063596 on May 28, 2012, now Pat. No. 10,601,038.

(30) Foreign Application Priority Data

Jul. 26, 2011 (JP) .................................. 2011-163341

(51) Int. Cl.
| | | |
|---|---|---|
| H01M 4/525 | (2010.01) | |
| C01G 53/00 | (2006.01) | |
| H01M 10/052 | (2010.01) | |

(52) U.S. Cl.
CPC ............ H01M 4/525 (2013.01); C01G 53/42 (2013.01); C01P 2006/12 (2013.01);
(Continued)

(58) Field of Classification Search
None
See application file for complete search history.

(56) References Cited

U.S. PATENT DOCUMENTS 10,511,020 B2 * 12/2019 Imaizumi .............. H01M 4/525
2004/0197658 A1  10/2004 Kase et al.
(Continued)

FOREIGN PATENT DOCUMENTS

JP      5-242891 A     9/1993
JP    2003-17054 A    1/2003
(Continued)

OTHER PUBLICATIONS

English Machine translation of JP2010-155775A—2010.
(Continued)

Primary Examiner — Lucas J. O'Donnell
(74) Attorney, Agent, or Firm — Westerman, Hattori, Daniels & Adrian, LLP

(57) ABSTRACT

A method for manufacturing a positive electrode active material includes: (a) preparing a fired powder of a lithium nickel composite oxide by mixing a nickel compound selected from a nickel hydroxide including nickel, and an element selected from other transition metal elements, elements of the second group and elements of the thirteenth group of the Periodic System, a nickel oxyhydroxide thereof, and a nickel oxide obtained by roasting thereof, and (Continued)

a lithium compound, and firing the mixture at a maximum temperature of 650° C. to 850° C. under oxygen atmosphere; and (b) preparing a lithium nickel composite oxide powder by mixing the fired powder with water to obtain a slurry, washing the fired powder with water at a temperature of 10° C. to 40° C., while controlling an electrical conductivity of a liquid portion of the slurry to 30 mS/cm to 60 mS/cm, then filtering and drying the resultant fired powder.

9 Claims, 1 Drawing Sheet

(52) U.S. Cl.
CPC ...... *C01P 2006/40* (2013.01); *C01P 2006/80* (2013.01); *H01M 10/052* (2013.01)

(56) References Cited

U.S. PATENT DOCUMENTS

| 2004/0234853 | A1 | 11/2004 | Adachi et al. |
| 2007/0202405 | A1 | 8/2007 | Shizuka et al. |
| 2007/0231691 | A1 | 10/2007 | Abe et al. |
| 2007/0231694 | A1 | 10/2007 | Abe et al. |
| 2012/0292561 | A1 | 11/2012 | Sasaoka et al. |
| 2014/0054495 | A1 | 2/2014 | Paulsen et al. |

FOREIGN PATENT DOCUMENTS

| JP | 2007-273108 | A | 10/2007 |
| JP | 2008-277087 | A | 11/2008 |
| JP | 2009-140787 | A | 6/2009 |
| JP | 2009-140909 | A | 6/2009 |
| JP | 2010-76963 | A | 4/2010 |
| JP | 2010-155775 | A | 7/2010 |
| JP | 2011-34861 | A | 2/2011 |
| JP | 2011-96655 | A | 5/2011 |
| WO | 2011/016372 | A1 | 2/2011 |
| WO | 2011089958 | A1 | 7/2011 |

OTHER PUBLICATIONS

Goto et al., "Deterioration mechanism of lithium nickelate, cathode material for Li-ion battery, in air and infuence to the cell swelling", Abstracts of Proceedings of the 47th Battery Symposium, Nov. 20-22, 2006, pp. 326-327.
High-Density Lithium Secondary Battery, Techno System Co., Ltd., Mar. 14, 1998, pp. 61-78.
International Search Report dated Sep. 4, 2012, issued in corresponding application No. PCT/JP2012/063596.
Office Action dated Mar. 24, 2015, issued in corresponding Japanese Patent Application No. 2011-163341 (3 pages).
EN translation of JP2010-155775—Jul. 15, 2010.

* cited by examiner

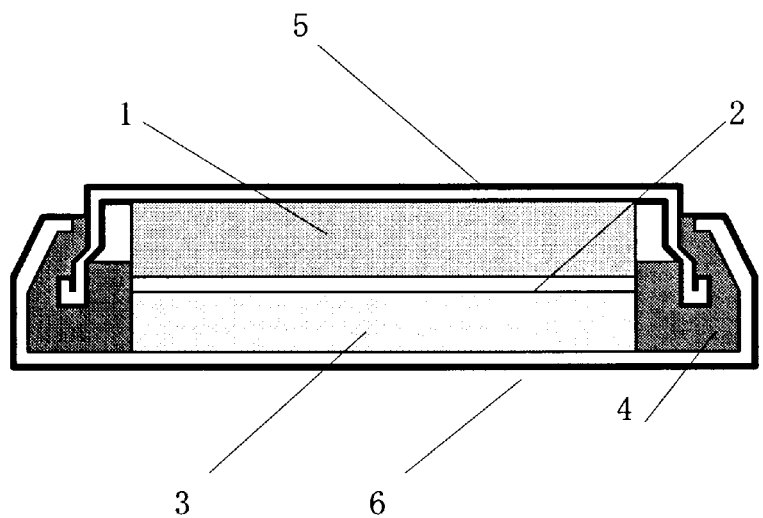

POSITIVE ELECTRODE ACTIVE MATERIAL MANUFACTURING METHOD WITH CONTROL OF WASHING SLURRY LIQUID ELECTRICAL CONDUCTIVITY

CROSS-REFERENCE OF RELATED APPLICATIONS

This application is a Divisional of application Ser. No. 14/119,350 filed Nov. 21, 2013, which is a 371 of International Application No. PCT/JP2012/063596 filed May 28, 2012, which claims priority of Japanese Patent Application No. 2011-163341 filed Jul. 26, 2011 in Japan, the entire contents of which are incorporated herein by reference.

TECHNICAL FIELD

The present invention relates to a positive electrode active material for a nonaqueous electrolyte secondary battery, a method for producing the same, and a nonaqueous electrolyte secondary battery using the same, and more specifically to a positive electrode active material for a nonaqueous electrolyte secondary battery that combines a high capacity with excellent thermal stability and enables a high output, a method for producing the same, and a nonaqueous electrolyte secondary battery having a high capacity, a high output and high safety that uses the positive electrode active material.

BACKGROUND ART

In recent years, a rapid spread of compact electronic device such as cellular phones and notebook personal computers created a huge demand for nonaqueous electrolyte secondary batteries as rechargeable power sources. Lithium cobalt composite oxides represented by lithium cobaltate ($LiCoO_2$) and also lithium nickel composite oxides represented by lithium nickelate ($LiNiO_2$) and lithium manganese composite oxides represented by lithium manganate ($LiMn_2O_4$) have been widely used as positive electrode active materials for the nonaqueous electrolyte secondary batteries.

The problems associated with lithium cobaltate are that it includes, as a major component, cobalt which is expensive due to scarce reserves and which is a metal with unstable supply and large price fluctuations. Accordingly, lithium nickel composite oxides and lithium manganese composite oxides containing relatively inexpensive nickel and manganese as the main components have attracted attention due to a low cost thereof.

However, although lithium manganate is superior to lithium cobaltate in terms of thermal stability, the applications thereof to batteries are associated with a large number of problems since the charge-discharge capacity thereof is greatly inferior to that of other materials and the charge-discharge cycle characteristic representing the service life is extremely short. Meanwhile, lithium nickelate demonstrate a charge-discharge capacity larger than that of lithium cobaltate and, therefore, is expected to be a positive electrode active material suitable for producing inexpensive batteries having a high energy density.

However, lithium nickelate is usually manufactured by mixing and firing a lithium compound and a nickel compound such as nickel hydroxide and nickel oxyhydroxide, and the product is in the form of a powder with monodispersed primary particles, or a powder of secondary particles, which are aggregates of primary particles and have voids. The drawback of either form is that thermal stability in a charged state is inferior to that of lithium cobaltate. Thus, pure lithium nickelate has not found applications in batteries for practical use due to problems associated with thermal stability and charge-discharge cycle characteristic. This is because the stability of crystal structure thereof in a charged state is lower than that of lithium cobaltate.

This problem is typically solved by substituting part of nickel with a transition metal element such as cobalt, manganese and iron, or a dissimilar element such as aluminum, vanadium, and tin, thereby stabilizing the crystal structure in a state in which lithium is desorbed in charging and producing a lithium nickel composite oxide with good thermal stability and charge-discharge cycle characteristic for a positive electrode active material (see, for example, Patent Literature 1 and Non-Patent Literature 1).

However, where the amount of the substitution element in this method is small, thermal stability cannot be sufficiently improved, and where the amount of the substitution element is large, the capacity is decreased. Therefore, the superiority of lithium nickel composite oxide cannot be realized in batteries.

Further, where a lithium nickel composite oxide is used as is after the synthesis involving firing, battery performance cannot be sufficiently demonstrated in charging and discharging due to the effect of lithium carbonate and lithium sulfate remaining on grain boundaries or the like. For this reason, impurities have been removed by washing with water (see, for example, Patent Literature 2). Washing with water has also been considered as an effective method because where the impurities present on the surface are washed off, a true specific surface area is revealed as an indicator, and correlation with thermal stability and capacity is demonstrated (see, for example, Patent Literature 3).

However, in either case, true causes of poor battery performance and mechanisms thereof have not been sufficiently clarified and sufficient capacity and output and excellent thermal stability could not be ensured only by removing the impurities and controlling the specific surface area. The resultant problem is that battery performance cannot be fully utilized.

Meanwhile, lithium nickel composite oxides use an alkali such as lithium hydroxide, and the alkali reacts with carbon dioxide in the synthesis, thereby producing lithium carbonate ($Li_2CO_3$). The resultant problem is that this compound generates gas at a high temperature and causes the battery to expand (see, for example, Non-Patent Literature 1). Further, lithium nickel composite oxides demonstrate high sensitivity to the atmosphere, and there is a concern that lithium hydroxide (LiOH) remaining on the surface even after firing could be carbonated and lithium carbonate could be further generated till the positive electrode is completely manufactured (see, for example, Non-Patent Literature 2).

Although the improvement caused by the aforementioned washing with water has been investigated with respect to the improvement of thermal stability by removing surface impurities and controlling the specific surface area, the problem of battery expanding due to gas generation has not been addressed.

A variety of methods for evaluating gas generation by a positive electrode active material have heretofore been suggested to resolve this problem (see, for example, Patent Literature 4 to 6).

However, the problem associated with Patent Literature 4 is that only the water-soluble alkali fraction revealing lithium hydroxide on the surface is specified and a lithium carbonate fraction that causes gas generation at a high temperature is not specified. Further, the problem associated with Patent Literature and Patent Literature 6 is that only the lithium carbonate fraction is specified and the lithium hydroxide fraction that can change into lithium carbonate before the production of the positive electrode is completed is not specified.

With the foregoing in view, it has been necessary to resolve the problems inherent to the related art and to develop a positive electrode active material for a nonaqueous electrolyte secondary battery that combines a high capacity with excellent thermal stability and enables a high output, while clarifying true causes of poor battery performance and mechanism thereof in a positive electrode active material constituted by a lithium nickel composite oxide.

CITATION LIST

Patent Literature

Patent Literature 1: Japanese Patent Application Publication No. H5-242891
Patent Literature 2: Japanese Patent Application Publication No. 2003-17054
Patent Literature 3: Japanese Patent Application Publication No. 2007-273108
Patent Literature 4: Japanese Patent Application Publication No. 2009-140787
Patent Literature 5: Japanese Patent Application Publication No. 2008-277087
Patent Literature 6: Japanese Patent Application Publication No. 2009-140909

Non Patent Literature

Non-Patent Literature 1: High-Density Lithium Secondary Battery, Techno System Co., Ltd., Mar. 14, 1998, pages 61 to 78
Non-Patent Literature 2: Abstracts of Proceedings of the 47th Battery Symposium, Nov. 20 to 22, 2006, pages 326 to 327

SUMMARY OF INVENTION

Technical Problem

In view of the above-described problems inherent to the related art, it is an object of the present invention to provide a positive electrode active material for a nonaqueous electrolyte secondary battery that combines a high capacity with excellent thermal stability and enables a high output, a method for producing the same, and a nonaqueous electrolyte secondary battery having a high capacity, a high output and high safety that uses such positive electrode active material, while clarifying true causes of poor battery performance and mechanism thereof.

Solution to Problem

In order to attain the above-described objects, the inventors have conducted a comprehensive study of positive electrode active materials for nonaqueous electrolyte secondary batteries constituted by lithium nickel composite oxides, and methods for producing the same. The results obtained have demonstrated that battery capacity, high output and gas generation at a high temperature of positive electrode active materials are strongly influenced by the amount of lithium carbonate present at the surface of lithium nickel composite oxide particles, and that a low internal resistance and a predetermined specific surface area can be obtained, a high capacity and a high output can be demonstrated when the positive electrode active material is used in a battery, gas generation at a high temperature is inhibited, and excellent thermal stability can be obtained by controlling the amount of lithium carbonate to a value equal to or lower than a specific value. It has also been discovered that washing the fired powder with water under specific conditions is very important for controlling the amount of lithium carbonate present on the surface of lithium nickel composite oxide particles to a value equal to or lower than a specific value, and that such washing with water makes it possible to obtain a lithium nickel composite oxide demonstrating excellent properties as a positive electrode active material for a nonaqueous electrolyte secondary battery.

Thus, according to a first aspect of the present invention, there is provided the positive electrode active material for a nonaqueous electrolyte secondary battery, including a lithium nickel composite oxide represented by the following general formula (1):

General formula: $Li_bNi_{1-a}M1_aO_2$     (1)

(where M1 represents at least one element selected from transition metal elements other than Ni, elements of the second group of the Periodic System and elements of the thirteenth group of the Periodic System; a satisfies the condition $0.01 \le a \le 0.5$; and b satisfies the condition $0.85 \le b \le 1.05$), wherein a specific surface area is 0.5 m²/g to 2.05 m²/g and a content of carbon in the lithium nickel composite oxide is adjusted to a value equal to or less than 0.08% by mass of a total amount.

According to a second aspect of the present invention, there is provided the positive electrode active material for a nonaqueous electrolyte secondary battery according to the first aspect, wherein an amount of lithium in a lithium compound present on a surface of the lithium nickel composite oxide is adjusted to a value equal to or less than 0.10% by mass of a total amount.

According to a third aspect of the present invention, there is provided the positive electrode active material for a nonaqueous electrolyte secondary battery according to the first aspect, wherein the lithium nickel composite oxide is represented by the following general formula (2):

General formula: $Li_bNi_{1-x-y-z}Co_xAl_yM2_zO_2$     (2)

(where M2 is at least one element selected from the group consisting of Mn, Ti, Ca, and Mg; b satisfies the condition $0.85 \le b \le 1.05$; x satisfies the condition $0.05 \le x \le 0.30$; y satisfies the condition $0.01 \le y \le 0.1$; and z satisfies the condition $0 \le z \le 0.05$).

According to a fourth aspect of the present invention, there is provided the positive electrode active material for a nonaqueous electrolyte secondary battery according to the first aspect, wherein the content of carbon is 0.01% by mass to 0.04% by mass.

According to a fifth aspect of the present invention, there is provided the positive electrode active material for a nonaqueous electrolyte secondary battery according to the second aspect, wherein the amount of lithium is a mass ratio of lithium to lithium nickel composite oxide determined by adding the lithium nickel composite oxide to a solution to obtain a slurry, determining an amount of an alkali fraction (lithium compound) by titrating a pH of the slurry with an acid under an assumption that a lithium compound present on a surface is a total alkali fraction in the slurry, and recalculating this amount into lithium.

According to a sixth aspect of the present invention, there is provided the positive electrode active material for a nonaqueous electrolyte secondary battery according to the fifth aspect, wherein the acid is at least one acid selected from the group consisting of hydrochloric acid, sulfuric acid, nitric acid, and organic acids.

According to a seventh aspect of the present invention, there is provided a method for manufacturing the positive electrode active material for a nonaqueous electrolyte secondary battery according to any one of the first to sixth aspects, the method including:

(a) a step for preparing a fired powder of a lithium nickel composite oxide represented by the following composition formula (3):

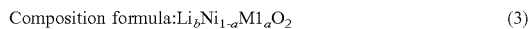

Composition formula: $Li_bNi_{1-a}M1_aO_2$       (3)

(where M1 represents at least one element selected from transition metal elements other than Ni, elements of the second group of the Periodic System and elements of the thirteenth group of the Periodic System; a satisfies the condition $0.01 \leq a \leq 0.5$; and b satisfies the condition $0.95 \leq b \leq 1.13$) by mixing at least one nickel compound selected from a nickel hydroxide including nickel as a main component and at least one element selected from other transition metal elements, elements of the second group of the Periodic System, and elements of the thirteenth group of the Periodic System as an auxiliary component, a nickel oxyhydroxide thereof, and a nickel oxide obtained by roasting thereof, and a lithium compound, and then firing the mixture at a maximum temperature in a range of 650° C. to 850° C. under oxygen atmosphere; and (b) a step for preparing a lithium nickel composite oxide powder by mixing the fired powder with water to obtain a slurry, washing the fired powder with water at a temperature of 10° C. to 40° C., while controlling an electrical conductivity of a liquid portion of the slurry to 30 mS/cm to 60 mS/cm, then filtering and drying the resultant fired powder.

According to an eighth aspect of the present invention, there is provided the method for manufacturing a positive electrode active material for a nonaqueous electrolyte secondary battery according to the seventh aspect, wherein in the step (b), the fired powder after water washing treatment is dried under a gas atmosphere including no compound component containing carbon, or under a vacuum atmosphere.

Further, according to a ninth aspect of the present invention, there is provided the method for manufacturing a positive electrode active material for a nonaqueous electrolyte secondary battery according to the seventh aspect, wherein the nickel hydroxide is prepared by dropping an aqueous solution of a metal compound including nickel as a main component and at least one element selected from other transition metal elements, elements of the second group of the Periodic System, and elements of the thirteenth group of the Periodic System as an auxiliary component, and an aqueous solution including an ammonium ion supplying substance into a heated reaction tank, and optionally dropping, as appropriate, in this process, an aqueous solution of an alkali metal hydroxide in an amount necessary to maintain a reaction solution in an alkaline state.

According to a tenth aspect of the present invention, there is provided the method for manufacturing a positive electrode active material for a nonaqueous electrolyte secondary battery according to the seventh aspect, wherein the nickel oxyhydroxide is prepared by dropping an aqueous solution of a metal compound including nickel as a main component and at least one element selected from other transition metal elements, elements of the second group of the Periodic System, and elements of the thirteenth group of the Periodic System as an auxiliary component, and an aqueous solution including an ammonium ion supplying substance into a heated reaction tank, optionally dropping, as appropriate, in this process, an aqueous solution of an alkali metal hydroxide in an amount necessary to maintain a reaction solution in an alkaline state, and then adding an oxidizing agent.

According to an eleventh aspect of the present invention, there is provided the method for manufacturing a positive electrode active material for a nonaqueous electrolyte secondary battery according to the seventh aspect, wherein the lithium compound is at least one selected from the group consisting of lithium hydroxide, oxyhydroxide, oxide, carbonate, nitrate, and halides.

According to a twelfth aspect of the present invention, there is provided the method for manufacturing a positive electrode active material for a nonaqueous electrolyte secondary battery according to the seventh aspect, wherein in step (a), a mixing ratio of the nickel compound and lithium compound is 0.95 to 1.13 as a molar ratio of a lithium amount in the lithium compound to a total amount of nickel, other transition metal elements, elements of the second group of the Periodic System, and elements of the thirteen group of the Periodic System in the nickel oxide.

According to a thirteenth aspect of the present invention, there is provided a nonaqueous electrolyte secondary battery using the positive electrode active material for a nonaqueous electrolyte secondary battery according to any one of the first to sixth aspects.

Advantageous Effects of Invention

According to the present invention, it is possible to obtain a positive electrode active material for a nonaqueous electrolyte secondary battery that is constituted by a lithium nickel composite oxide that combines a high capacity with excellent thermal stability and enables a high output when used in a battery. Further, the manufacturing method thereof is easy to implement, has high productivity, and the industrial value thereof is very high.

BRIEF DESCRIPTION OF THE DRAWING

FIG. 1 is a cross-sectional view showing a schematic structure of a 2032-type coin battery.

DESCRIPTION OF EMBODIMENTS

The positive electrode active material for a nonaqueous electrolyte secondary battery in accordance with the present invention, the manufacturing method thereof, and the nonaqueous electrolyte secondary battery using the same will be explained in detail below.

1. Positive Electrode Active Material for Nonaqueous Electrolyte Secondary Battery The positive electrode active material for a nonaqueous electrolyte secondary battery in accordance with the present invention (also referred to hereinbelow as "positive electrode active material in accordance with the present invention") is a positive electrode active material including a lithium nickel composite oxide represented by the following general formula (1):

General formula: $Li_bNi_{1-a}M1_aO_2$       (1)

(where M1 represents at least one element selected from transition metal elements other than Ni, elements of the second group of the Periodic System and elements of the thirteenth group of the Periodic System; a satisfies the condition 0.01≤a≤0.5; and b satisfies the condition 0.85≤b≤1.05), wherein a specific surface area is 0.5 m²/g to 2.05 m²/g and a content of carbon in the lithium nickel composite oxide is adjusted to a value equal to or less than 0.08% by mass of a total amount.

The lithium nickel composite oxide is not particularly limited provided it is a compound represented by the general formula (1), but among such compounds the lithium nickel composite oxide represented by the following general formula (2) is preferred:

General formula: $Li_bNi_{1-x-y-z}Co_xAl_yM2_zO_2$ (2)

(where M2 is at least one element selected from the group consisting of Mn, Ti, Ca, and Mg; b satisfies the condition 0.85≤b≤1.05; x satisfies the condition 0.05≤x≤0.30; y satisfies the condition 0.01≤y≤0.1; and z satisfies the condition 0≤z≤0.05).

Where lithium carbonate is present on the surface of the positive electrode active material constituted by the lithium nickel composite oxide and the battery using the positive electrode active material is held in a high-temperature state, a gas is generated due to decomposition of the lithium carbonate and the battery is expanded. As a result, safety decreases.

Therefore, it is necessary to reduce the amount of lithium carbonate on the positive electrode active material surface to a minimum.

The inventors have discovered a correlation between the content of carbon in the lithium nickel composite oxide and lithium carbonate present on the surface and have found out that gas generation inside the battery can be inhibited by controlling the carbon content to a value equal to or lower than a specific value. An especially significant effect of inhibiting the gas generation has been confirmed in a lithium nickel composite oxide subjected to water washing treatment.

However, it is not sufficient only to decrease the amount of lithium carbonate at the surface of the positive electrode active material at production. Thus, in the lithium nickel composite oxide constituting the positive electrode active material in accordance with the present invention, excess impurities such as lithium carbonate, lithium sulfate, and lithium hydroxide generally remain on the surface thereof or on the crystal grain boundaries. Lithium hydroxide present on the surface reacts with carbon dioxide gas contained in the atmosphere and becomes lithium carbonate after the positive electrode active material has been manufactured and before it is incorporated in a battery, and the amount of lithium carbonate on the positive electrode active material surface increases over that immediately after the positive electrode active material has been manufactured. Therefore, gas generation at a high temperature can be inhibited more effectively by controlling not only the amount of lithium carbonate, but also the amount of lithium hydroxide on the positive electrode active material surface.

In accordance with the present invention, the inhibition of gas generation at a high temperature is enabled by controlling the content of carbon in the lithium nickel composite oxide to a value equal to or lower than 0.08% by mass with respect to the total amount. Where the content of carbon exceeds 0.08% by mass, the amount of lithium carbonate in the positive electrode active material used in a battery increases, and where lithium carbonate is exposed to a high temperature, it is decomposed, the amount of generated gas increases, and the battery bulges. It is even more preferred that the content of carbon be equal to or less than 0.04% by mass.

Meanwhile the lower limit of the content of carbon is not particularly limited, but it is preferred that the content of carbon be equal to or greater than 0.01% by mass. Where the content of carbon is less than 0.01% by mass, a state in which the lithium nickel composite oxide has been excessively washed can be attained.

The problem arising when the lithium nickel composite oxide is excessively washed is that lithium present in the vicinity of crystals of the lithium nickel composite oxide is desorbed, NiO obtained by removal of Li, or NiOOH obtained by substitution of Li with H is formed in the surface layer, and since either of them has a high electric resistance, the resistance of particle surface increases.

In the present invention, the amount of lithium means the mass ratio of lithium in the lithium compound present on the surface of lithium nickel composite oxide particles to the total of lithium nickel composite oxide particles, and gas generation at a high temperature can be inhibited more effectively by making the amount of lithium equal to or less than 0.10% by mass. Lithium compounds other than lithium hydroxide and lithium carbonate are also present on the positive electrode active material surface, but in the case of production under the usual conditions, a larger portion is constituted by lithium hydroxide and lithium carbonate, and by controlling the amount thereof as the amount of lithium present on the positive electrode active material surface, it is possible to inhibit gas generation at a high temperature more effectively.

Where the amount of lithium present on the surface exceeds 0.10% by mass, the amount of lithium carbonate in the positive electrode active material used in a battery increases, and where lithium carbonate is exposed to a high temperature, it is decomposed, the amount of generated gas increases, and the battery can bulge. It is even more preferred that the amount of lithium be equal to or less than 0.05% by mass.

Meanwhile the lower limit of the amount of lithium present on the surface is not particularly limited, but it is preferred that the amount of lithium be equal to or greater than 0.01% by mass. Where the amount of lithium is less than 0.01% by mass, a state in which the lithium nickel composite oxide has been excessively washed can be attained. Thus, when the lithium nickel composite oxide powder has been excessively washed, a state is attained in which practically no lithium compound is present on the surface.

However, the amount of lithium is determined in the below-described manner, and in some cases, lithium is eluted in microamounts from inside the lithium nickel composite oxide and the amount of lithium less than 0.01% by mass is detected as the aforementioned amount of lithium. In the case of excess washing, a problem of the electric resistance rising on the particle surface is encountered. Another problem is that the amount of Li in the lithium nickel composite oxide decreases and capacity is reduced.

The amount of lithium in the lithium compound present on the surface of lithium nickel composite oxide can be quantitatively determined by titration with an acid using pH of the aforementioned slurry as an indicator after a solvent has been added to the lithium nickel composite oxide and a slurry has been obtained, and the result obtained can be used to determine the mass ratio of lithium present on the surface to the lithium nickel composite oxide.

Thus, an alkali component in the slurry is quantitatively determined in the titration, but where the impurities contained in the lithium nickel composite oxide are removed, this alkali component can be considered as lithium in a lithium compound such as lithium hydroxide and lithium carbonate (including sodium hydrogen carbonate). Therefore, it is possible to take the alkali component quantitatively determined by neutralization by titration as lithium in the lithium compound present on the powder surface and determine the mass ratio of this lithium to the lithium nickel composite oxide as the amount of lithium.

In order to prevent impurities from admixing to the slurry, it is preferred that pure water, for example, water with 1 μS/cm or less, preferably 0.1 μS/cm or less, be used as the solvent, and the slurry concentration is preferably such that the ratio of the solvent is 5 parts by mass to 100 parts by mass per 1 part by mass of the lithium nickel composite oxide, so as to dissolve sufficiently the lithium compound present on the lithium nickel composite oxide surface in the solvent and facilitate the titration operations. Further, the acid may be any acid that is usually used in titration, and at least one acid selected from the group consisting of hydrochloric acid, sulfuric acid, nitric acid, and organic acids is preferred.

The titration conditions may be the usual conditions used in titration of alkaline solutions with pH as an indicator, and the equivalence point can be determined from the inflection point of pH. For example, the equivalence point of lithium hydroxide is close to pH 8, and the equivalence point of lithium carbonate is close to pH 4.

Physical properties of the positive electrode active material in accordance with the present invention will be described below.

The positive electrode active material in accordance with the present invention is a positive electrode active material constituted by a lithium nickel composite oxide powder and is obtained, for example, by mixing a fired powder having the following composition formula (3):

Composition formula(3):$Li_bNi_{1-a}M1_aO_2$  (3)

(where M1 represents at least one element selected from transition metal elements other than Ni, elements of the second group of the Periodic System and elements of the thirteenth group of the Periodic System; a satisfies the condition $0.01 \leq a \leq 0.5$; and b satisfies the condition $0.95 \leq b \leq 1.13$) with water to obtain a slurry, washing the fired powder with water at a temperature of 10° C. to 40° C., while controlling an electrical conductivity of a liquid portion of the slurry to 30 mS/cm to 60 mS/cm, then filtering and drying the resultant fired powder.

When a lithium nickel composite oxide is used as a positive electrode active material for a secondary battery, excess impurities such as lithium carbonate, lithium sulfate, and lithium hydroxide generally remain on the surface thereof or on crystal grain boundaries, and a lithium ion secondary battery using the positive electrode active material has a high internal resistance inside the battery and cannot sufficiently demonstrate the performance inherent to the material with respect to charge-discharge efficiency and cycle performance. By contrast, where the impurity components present on the surface or grain boundaries are removed by water washing treatment or the like, the internal resistance is reduced and the performance intrinsic to the battery can be sufficiently demonstrated.

In the positive electrode active material in accordance with the present invention, the impurity components are removed by the aforementioned water washing treatment at a temperature of 10° C. to 40° C. As a result, when the positive electrode active material is used in a battery, the internal resistance is greatly reduced and a high-output battery can be obtained.

As for the specific surface area of the positive electrode active material in accordance with the present invention, the specific surface area after the water washing treatment is 0.5 m²/g to 2.05 m²/g. Where the specific surface area of the powder after the water washing treatment is above 2.05 m²/g, the amount of heat generated by the reaction with the electrolytic solution rapidly increases and thermal stability can be decreased. Meanwhile, where the specific surface area is less than 0.5 m²/g, heat generation is inhibited, but the capacity and output characteristic of the battery can be degraded.

Further, the moisture content of the powder after drying is preferably equal to or less than 0.2% by mass, more preferably 0.1% by mass, and still more preferably 0.05% by mass. This is because, where the moisture content of the powder exceeds 0.2% by mass, gas components including carbon and sulfur present in the atmosphere are absorbed and a lithium compound can be produced on the surface, thereby causing gas generation at a high temperature. The measured value of moisture content is measured by a Carl Fischer moisture meter.

Further, the positive electrode active material in accordance with the present invention is preferably a single phase of the lithium nickel composite oxide having a hexagonal layered structure (hereafter it may be simply referred to as a single phase of the lithium nickel composite oxide). Where a foreign phase is present, battery characteristics are degraded.

Additive elements constituting the lithium nickel composite oxide represented by general formula (2) above and the addition amounts thereof will be explained below.

(a) Co

Co is an additive element contributing to improvement of the cycle characteristic. Where the x value is less than 0.05, sufficient cycle characteristic cannot be obtained and the capacity retention rate decreases as well. Where the x value exceeds 0.3, the decrease in initial discharge capacity increases.

(b) Al

Aluminum is an additive element effective in improving safety. Where the y value, which represents the addition amount thereof, is less than 0.01, the addition amount is too small and the effect thereof is too low. The y value above 0.1 is undesirable because although safety increases according to the addition amount, the charge-discharge capacity decreases. In order to inhibit the decrease in charge-discharge capacity, a range of 0.01 to 0.05 is preferred.

(c) M2

M2, as an additive element, is at least one element selected from Mn, Ti, Ca, and Mg. This element can be added to improve the cycle characteristic and safety. It is undesirable that z be above 0.05, since although the crystal structure is further stabilized, the initial discharge capacity is greatly decreased.

The positive electrode active material in accordance with the present invention is an excellent positive electrode active material for a nonaqueous electrolyte secondary battery because a high capacity equal to or greater than 175 mAh/g, more preferably equal to or greater than 180 mAh/g, is obtained, a high output is attained, gas generation at a high temperature is inhibited, and high safety is attained when the positive electrode active material is used in a battery.

2. Method for Manufacturing Positive Electrode Active Material for Nonaqueous Electrolyte Secondary Battery The method for manufacturing the positive electrode active material in accordance with the present invention includes the following steps (a) and (b).

(a) A step for preparing a fired powder of a lithium nickel composite oxide represented by the following composition formula (3):

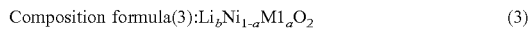

Composition formula(3):$Li_bNi_{1-a}M1_aO_2$    (3)

(where M1 represents at least one element selected from transition metal elements other than Ni, elements of the second group of the Periodic System and elements of the thirteenth group of the Periodic System; a satisfies the condition $0.01 \leq a \leq 0.5$; and b satisfies the condition $0.95 \leq b \leq 1.13$) by mixing at least one nickel compound selected from a nickel hydroxide including nickel as a main component and at least one element selected from other transition metal elements, elements of the second group of the Periodic System, and elements of the thirteenth group of the Periodic System as an auxiliary component, a nickel oxyhydroxide thereof, and a nickel oxide obtained by roasting thereof, and a lithium compound, and then firing the mixture at a maximum temperature in a range of 650° C. to 850° C. under oxygen atmosphere (referred to hereinbelow simply as step (a), or "firing step").

(b) A step for preparing a lithium nickel composite oxide powder by mixing the fired powder with water to obtain a slurry, washing the fired powder with water at a temperature of 10° C. to 40° C., while controlling the electrical conductivity of a liquid portion of the slurry to 30 mS/cm to 60 mS/cm, then filtering and drying the resultant fired powder (referred to hereinbelow simply as step (b) or "water washing and drying step".

The steps are described below.

(a) Firing Step

The firing step (a) is a step for preparing a fired powder of a lithium nickel composite oxide represented by the composition formula (1) above by mixing at least one nickel compound selected from a nickel hydroxide including nickel as a main component and at least one element selected from other transition metal elements, elements of the second group of the Periodic System, and elements of the thirteenth group of the Periodic System as an auxiliary component, a nickel oxyhydroxide thereof, and a nickel oxide obtained by roasting thereof, and a lithium compound, and then firing the mixture at a maximum temperature in a range of 650° C. to 850° C., preferably 700° C. to 800° C., more preferably 755° C. to 780° C. under oxygen atmosphere.

The nickel compound used in step (a), is selected from the group consisting of a nickel hydroxide including nickel as a main component and at least one element selected from other transition metal elements, elements of the second group of the Periodic System and elements of the thirteenth group of the Periodic System as an auxiliary component, a nickel oxyhydroxide thereof, and a nickel oxide obtained by roasting thereof.

Lithium nickel composite oxide obtained by a variety of methods can be used to obtain the abovementioned positive electrode active material. The preferred among them is a lithium nickel composite oxide obtained by mixing a lithium compound and a nickel compound in which a metal element other than lithium is solid-state dissolved or dispersed by a crystallization method, and firing the mixture.

Thus, typical methods for manufacturing a lithium nickel composite oxide include a method of using a lithium compound and a nickel compound in which a metal element other than lithium is solid-state dissolved or dispersed by a crystallization method as starting materials, mixing the starting materials, and firing the mixture, a method of mixing all of the aqueous solutions including the desired metal elements, and subjecting the liquid mixture of spray pyrolysis treatment, and a method of pulverizing and mixing all of the compounds of the desired metal elements by mechanical pulverization such as ball milling and then firing the mixture.

However, among those methods, in methods other than those in which the nickel starting material is manufactured by a crystallization method, the specific surface area of the obtained lithium nickel composite oxide is very large and, therefore, a problem is associated with thermal stability and the methods are inefficient. Further, where the crystallization method is used, a nickel hydroxide or nickel oxyhydroxide, which is a nickel compound forming spherical particles with an advantageously high bulk density, can be manufactured as a positive electrode active material. Therefore, such compounds, also inclusive of nickel oxide obtained by roasting thereof, are also advantageous in terms of filling ability. Accordingly, the crystallization method is most suitable for manufacturing lithium nickel composite oxides.

Nickel hydroxide to be used in the above-described step (a) is not particularly limited, and the compounds obtained by the crystallization method under a variety of conditions can be used. The preferred among them is prepared, for example, by dropping an aqueous solution of a metal compound including nickel as a main component and at least one element selected from other transition metal elements, elements of the second group of the Periodic System, and elements of the thirteenth group of the Periodic System as an auxiliary component, and an aqueous solution including an ammonium ion supplying substance into a reaction tank heated preferably to 40° C. to 60° C., and optionally dropping, as appropriate, in this process, an aqueous solution of an alkali metal hydroxide in an amount necessary to maintain a reaction solution in an alkaline state, preferably at a pH of 10 to 14. Thus, nickel hydroxide manufactured by this method is a powder with a high bulk density and, therefore, is advantageous as a starting material for a lithium nickel composite oxide to be used for a positive electrode active material for a nonaqueous electrolyte secondary battery.

Where the temperature exceeds 60° C. or pH exceeds 14, priority of nucleation in the liquid increases, crystal growth does not advance, and only a fine powder is obtained. Meanwhile, the problem arising when the temperature is less than 40° C. or pH is less than 10 is that nucleation in the liquid decreases, crystal growth of grains becomes a priority and, therefore, very large particles, such that cause depressions and protrusions in the electrode fabrication process, are produced, or the residual amount of metal ions in the reaction liquid increases, thereby leading to extremely poor reaction efficiency.

The nickel oxyhydroxide to be used in the abovementioned step (a) is not particularly limited, but the preferred nickel oxyhydroxide is prepared by further adding an oxidizing agent such as sodium hyperchlorite and hydrogen peroxide to the nickel hydroxide. Thus, the nickel oxyhydroxide produced by this method is a powder with a high bulk density and, therefore, advantageous as a staring material for the lithium nickel composite oxide to be used for the positive electrode active material for a nonaqueous electrolyte secondary battery.

The nickel oxide to be used in the abovementioned step (a) is not particularly limited, but the preferred nickel oxide is obtained by roasting the above-described nickel hydroxide or nickel oxyhydroxide. The roasting conditions of the nickel hydroxide or nickel oxyhydroxide are not particularly limited, and it is desirable that roasting be performed, for example, under air atmosphere at a temperature of preferably 500° C. to 1100° C., more preferably 600° C. to 1000° C., and even more preferably 650° C. to 745° C. In this case, where the roasting temperature is below 500° C., quality of the lithium nickel composite oxide obtained by using the roasted material is difficult to stabilize, and a heterogeneous composition is easily formed in synthesis. Meanwhile, where the roasting temperature is higher than 1100° C., primary particles constituting the particles start growing rapidly and the reaction surface area on the nickel compound side in the subsequent preparation of lithium nickel composite oxide becomes too small. The resultant problem is that the reaction with lithium is inhibited and specific gravity separation proceeds into the nickel compound with a high specific gravity in the lower layer and a lithium compound in a molten state in the upper layer.

In the manufacturing method in accordance with the present invention, the fired powder of the lithium nickel composite oxide represented by composition formula (1) above is prepared by mixing at least one nickel compound selected from the nickel hydroxide, a nickel oxyhydroxide thereof, and a nickel oxide obtained by roasting thereof, and a lithium compound, and then firing the mixture at a maximum temperature in a range of 650° C. to 850° C., preferably 700° C. to 800° C., and even more preferably 755° C. to 780° C. under oxygen atmosphere.

In the abovementioned mixing, a dry mixing machine or a mixing granulator such as a V blender is used. Further, in the abovementioned firing, a firing furnace such as an electric furnace, a kiln, a tubular furnace, and a pusher furnace is used, the furnace having a gas atmosphere adjusted to an oxygen concentration equal to or higher than 20% by mass, such as oxygen atmosphere or dry air atmosphere after dehumidification and removal of carbon dioxide removal treatment.

The abovementioned lithium compound is not particularly limited, and at least one compound selected from the group consisting of lithium hydroxide, oxyhydroxide, oxide, carbonate, nitrate, and halides can be used.

The mixing ratio of the nickel compound and the lithium compound in step (a) is not particularly limited, but is preferably adjusted, for example, such that a molar ratio of the lithium amount in the lithium compound to a total amount of nickel, other transition metal elements, elements of the second group of the Periodic System, and elements of the thirteen group of the Periodic System in the nickel oxide is 0.90 to 1.10.

Thus, where the molar ratio is less than 0.95 the molar ratio of the resultant fired powder is also less than 0.95, very poor crystallinity is obtained, and a molar ratio (b) of lithium and a metal other than lithium after water washing is less than 0.85, thereby causing a large decrease in battery capacity in charge-discharge cycling. Meanwhile, where the molar ratio is greater than 1.13, the molar ratio of the resultant fired powder is also greater than 1.13, an excess lithium compound is present in a large amount on the surface and this compound is difficult to remove by water washing. Therefore, where the fired powder is used as a positive electrode active material, a large amount of gas is generated when the battery is charged. Furthermore, since the powder has a high pH, it reacts with other materials, such as an organic solvent, used in electrode fabrication, and the slurry is gelled, thereby causing troubles. Further, where the molar ratio (b) after water washing exceeds 1.05, the internal resistance of the positive electrode in the battery increases.

A maximum temperature in a range of 650° C. to 850° C., preferably within a range of 700° C. to 800° C., and even more preferably 755° C. to 780° C. is used as the firing temperature. Thus, where the heat treatment is performed at a temperature higher than 500° C., lithium nickelate is generated, but at a temperature below 650° C., the crystals thereof are undeveloped and structurally unstable, and the structure is easily destroyed by phase transition caused by charging and discharging. Meanwhile, where the temperature exceeds 850° C., the layered structure collapses, lithium ions are unlikely to be introduced and detached, and nickel oxide or the like is formed by decomposition. Further, in order to ensure a uniform reaction in a temperature region in which crystal growth proceeds after the water of crystallization of the lithium compound has been removed, it is especially preferred that the firing be performed in two stages, that is, by prefiring for 1 h or longer at a temperature of 400° C. to 600° C. and then by firing for 3 h or longer at a temperature of 650° C. to 850° C.

(b) Water Washing and Drying Step

In step (b), the fired powder is washed and then filtered and dried.

In the water washing treatment of the fired powder, it is important that the fired powder be mixed with water to obtain a slurry and that the electrical conductivity of the liquid portion of the slurry be controlled to 30 mS/cm to 60 mS/min (can be also referred to hereinbelow as "liquid electrical conductivity") within a temperature range of 10° C. to 40° C., preferably 15° C. to 30° C.

By controlling the slurry temperature to 10° C. to 40° C. and the liquid electrical conductivity to 30 mS/cm to 60 mS/cm in the water washing treatment, it is possible to reduce the amount of lithium present on the surface of the lithium nickel composite oxide powder to a value equal to or less than 0.10% by mass and inhibit gas generation during storing at a high temperature. Further, it is possible to obtain a positive electrode active material in which a high capacity and a high output can be attained and also ensure high safety.

By contrast, where the water washing temperature is less than 10° C. or the liquid electrical conductivity is higher than 60 mS/cm, water washing is insufficient, and the impurities that have adhered to the fired powder surface cannot be removed and remain in a large amount. The impurities include lithium carbonate and lithium hydroxide, and the state is attained in which the carbon content in the lithium nickel composite oxide powder exceeds 0.08% by mass and gas generation easily occurs during storage at a high temperature. Further, since the remaining impurities increase the surface resistance, the resistance value increases when the powder is used for a positive electrode of a battery. In addition, the specific surface area becomes too small.

Meanwhile, where the water washing temperature exceeds 40° C., the amount of lithium eluting from the fired powder increases and lithium concentration in the washing liquid increases. As a result, the amount of lithium adhering again as lithium hydroxide to the powder surface increases, lithium hydroxide is carbonated in the air after the washing, and the carbon content exceeds 0.08% by mass. Further, since over-washing is performed and the specific surface area after the water washing treatment becomes too large, the amount of heat generated by the reaction with the electrolytic solution is thereby increased and thermal stability is decreased. In addition, NiO obtained by removal of Li, or NiOOH obtained by substitution of Li with H is formed in the surface layer, and since either of them has a high electric resistance, the resistance of particle surface increases, the amount of Li in the lithium nickel composite oxide decreases, and capacity decreases.

When the liquid electrical conductivity is less than 30 mS/cm, over-washing occurs and the over-washing causes problems.

The liquid electrical conductivity is affected by the slurry temperature and the content of lithium in the fired powder to be subjected to water washing treatment, and especially by the excess amount of lithium present on the particle surface, but can be controlled by the slurry concentration during the water washing treatment. Where the slurry concentration is decreased, the liquid electrical conductivity decreases, and where the slurry concentration is increased, the liquid electrical conductivity also increases. However, where the content of lithium in the fired powder and the production conditions are constant, the same slurry temperature and concentration ensure the same liquid electrical conductivity. Therefore, the liquid electrical conductivity can be easily controlled by determining the water washing conditions by preliminary tests, such as to obtain an optimum liquid electrical conductivity. The liquid electrical conductivity can be determined by measuring with conductance meter the electrical conductivity of the liquid portion obtained by solid-liquid separation of part of the slurry in this step, or the filtrate after the washing.

In accordance with the present invention, it is important to control the liquid electrical conductivity during the water washing treatment, but it is also effective to control the slurry concentration. Thus, it is preferred that the amount (g) of the fired powder per 1 L of water contained in the slurry be 500 g/L to 2000 g/L, more preferably 500 g/L to 1500 g/L, as the slurry concentration during water washing. Thus, the higher is the slurry concentration, the larger is the amount of the powder, and where the concentration exceeds 2000 g/L, the viscosity also becomes very high. As a result, not only the stirring becomes difficult, but because the amount of alkali in the liquid is high, the dissolution rate of the adhered matter decreases with respect to that in the equilibrium relationship, and even if peeling occurs, the adhered matter is unlikely to be separated from the powder. Meanwhile, where the slurry concentration is less than 500 g/L, the slurry is overdiluted and, therefore, the elution amount of lithium increases and the amount of lithium on the surface decreases. However, lithium is also detached from inside the crystal lattice of the positive electrode active material, and the crystals easily collapse, or a high-pH aqueous solution absorbs carbon dioxide contained in the air, thereby causing reprecipitation of lithium carbonate. Further, where productivity is considered from the industrial standpoint, in terms of equipment capacity and operability, it is desirable that the slurry concentration be 500 g/L to 2000 g/L. For example, in the process described in Japanese Patent Application Publication No. 2004-171961, washing is performed at a dilute slurry concentration of 40 g/L to evaluate the positive electrode active material, but the liquid electrical conductivity becomes too low at such a slurry concentration.

Further, the water washing time is not particularly limited, but it should be sufficient for the content of carbon in the lithium nickel composite oxide to become equal to or less than 0.08% by mass with respect to the total amount. The water washing time is usually 20 min to 2 h, but cannot be determined unconditionally because it depends on water washing temperature and electrical conductivity of the filtrate.

Water to be used in not particularly limited, but water with a measured electrical conductivity below 10 µS/cm is preferred, and water with a measured electrical conductivity equal to or less than 1 µS/cm is more preferred. Thus, the water with a measured electrical conductivity below 10 µS/cm makes it possible to prevent the degradation of battery performance caused by the adhesion of impurities to the positive electrode active material.

It is preferred that the amount of adhered water remaining on the particle surface during solid-liquid separation of the slurry be small. Where the amount of adhered water is large, lithium that has dissolved in the liquid reprecipitates, lithium present on the surface of the lithium nickel composite oxide powder during drying is carbonated and the content of carbon can increase. It is usually preferred that the content of the adhered water be 1% by mass to 10% by mass with respect to the lithium nickel composite oxide powder.

The drying temperature is not particularly limited, but is preferably 80° C. to 700° C., more preferably 100° C. to 550° C., even more preferably 120° C. to 350° C. Thus, the drying temperature is set to be equal to or higher than 80° C. in order to dry rapidly the positive electrode active material after washing with water and prevent the occurrence of lithium concentration gradient between the particle surface and the inside of the particles. Meanwhile, since it can be assumed that a state very close to a stoichiometric state or close to a charged state realized by a certain detachment of lithium is attained close to the surface of the positive electrode active material, the temperature in excess of 700° C. can induce the collapse of the crystal structure of the powder close to the charged state and degrade the electric characteristics. Further, to alleviate concerns about physical properties and characteristics of the positive electrode active material after washing with water, it is desirable that the temperature be 100° C. to 550° C., and in order to improve productivity and reduce thermal energy cost, it is desirable that the temperature be 120° C. to 350° C. In this case, it is preferred that the powder after the filtration be dried at a predetermined temperature by using a drying apparatus which can be controlled to a gas atmosphere including no compound component containing carbon or sulfur, or under a vacuum atmosphere. In particular, the increase in the content of carbon in the lithium nickel composite oxide can be inhibited by drying under the atmosphere including no compound component containing carbon.

3. Nonaqueous Electrolyte Secondary Battery

The nonaqueous electrolyte secondary battery in accordance with the present invention is a high-capacity and high-safety nonaqueous electrolyte secondary battery incorporating a positive electrode fabricated using a positive electrode active material constituted by the lithium nickel composite oxide, in particular by using the lithium nickel composite oxide obtained by the abovementioned manufacturing method as a positive electrode active material.

In accordance with the present invention, properties of the active material itself are improved. Therefore, the performance of the battery obtained by using the active material does not depend on the shape thereof. Thus, the battery shape is not limited to the coin battery shown in the examples and may be a cylindrical or angular shape obtained by winding band-shaped positive electrode and negative electrode with a separator interposed therebetween.

A method for fabricating a positive electrode to be used in the nonaqueous electrolyte secondary battery in accordance with the present invention will be explained below, but this method is not particularly limiting. For example, a positive electrode is fabricated in which a positive electrode mix including positive electrode active material particles and a binder is supported on a band-shaped positive electrode core material (positive electrode collector). The positive electrode mix can also include an additive such as a conductive material as an optional component. In order to support the positive electrode mix on the core material, the positive electrode mix is dispersed in a liquid component to prepare a paste, and the paste is coated on the core material and dried.

A thermoplastic resin or a thermosetting resin may be used as the binder for the positive electrode mix, but the thermoplastic resin is preferred.

Examples of thermoplastic resins include polyethylene, polypropylene, polytetrafluoroethylene (PTFE), polyvinylidene fluoride (PVDF), a styrene-butadiene rubber, a tetrafluoroethylene-hexafluoropropylene copolymer (FEP), a tetrafluoroethylene-perfluoroalkyl vinyl ether copolymer (PFA), a vinylidene fluoride hexafluoropropylene copolymer, a vinylidene fluoride chlorotrifluoroethylene copolymer, an ethylene tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene chlorotrifluoroethylene copolymer (ECTFE), a vinylidene fluoride-hexafluoropropylene-tetrafluoroethylene copolymer, a vinylidene fluoride perfluoromethyl vinyl ether-tetrafluoroethylene copolymer, an ethylene-acrylic acid copolymer, an ethylene-methacrylic acid copolymer, an ethylene methyl acrylate copolymer, and an ethylene-methyl methacrylate copolymer. Those compounds may be used individually or in combinations of two or more thereof. In addition, they may be crosslinked by $Na^+$ ions or the like.

Any electron conductive material which is chemically stable inside the battery can be used as the electrically conductive material of the positive electrode mix. Examples of suitable materials include graphite such as natural graphite (flaky graphite and the like) and artificial graphite; carbon black such as acetylene black, Ketjen black, channel black, furnace black, lamp black, and thermal black; conductive fibers such as carbon fibers and metallic fibers; metal powders such as aluminum; conductive whiskers such as zinc oxide and potassium titanate; a conductive metal oxide such as titanium oxide; organic conductive materials such as polyphenylene derivatives; and carbon fluoride. Those materials may be used individually or in combinations of two or more thereof.

The addition amount of the electrically conductive material of the positive electrode mix is not particularly limited, and it is preferably 0.5% by mass to 50% by mass, more preferably 0.5% by mass to 30% by mass, and still more preferably 0.5% by mass to 15% by mass, with respect to the positive electrode active material particles contained in the positive electrode mix.

Any positive electrode core material (positive electrode collector) may be used, provided that it is an electron conductive material that is chemically stable inside the battery. For example, a foil or a sheet constituted by aluminum, stainless steel, nickel, titanium, carbon, or a conductive resin can be used. Among them, an aluminum foil and an aluminum alloy foil are preferred. In this case, it is also possible to provide a carbon or titanium layer, or form an oxide layer on the surface of the foil or sheet. Further, depressions and protrusions can be formed on the surface of the foil or sheet, and it is also possible to use a net, a punching sheet, a lath material, a porous material, a foamed material, or a material obtained by molding a group of fibers.

The thickness of the positive electrode core material is not particularly limited, and can be, for example, 1 μm to 500 μm.

Constituent elements, other than the positive electrode, that are to be used in the nonaqueous electrolyte secondary battery in accordance with the present invention will be explained below. Since the specific feature of the nonaqueous electrolyte secondary battery in accordance with the present invention is in the use of the abovementioned positive electrode active material, other constituent elements are not particularly limited.

A material capable of charging and discharging lithium is used as a negative electrode. For example, a negative electrode prepared by supporting a negative electrode mix including a negative electrode active material and a binder and also an electrically conductive material and a thickening agent as optional components on a negative electrode core material can be used. Such a negative electrode can be fabricated by the same method as the positive electrode.

A material capable of electrochemically charging and discharging lithium may be used as the negative electrode active material. For example, graphite, hardly graphitizable carbon materials, and lithium alloys can be used. Among the lithium alloys those including at least one element selected from the group consisting of silicon, tin, aluminum, zinc and magnesium are particularly preferred.

The mean particle size of the negative electrode active material is not particularly limited and may be, for example, 1 μm to 30 μm A thermoplastic resin or a thermosetting resin may be used as a binder for the negative electrode mix, but the thermoplastic resin is preferred. Examples of thermoplastic resins include polyethylene, polypropylene, polytetrafluoroethylene (PTFE), polyvinylidene fluoride (PVDF), a styrene-butadiene rubber, a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride chlorotrifluoroethylene copolymer, an ethylene tetrafluoroethylene copolymer (ETFE), polychlorotrifluoroethylene (PCTFE), a vinylidene fluoride pentafluoropropylene copolymer, a propylene-tetrafluoroethylene copolymer, an ethylene chlorotrifluoroethylene copolymer (ECTFE), a vinylidene fluoride hexafluoropropylene tetrafluoroethylene copolymer, a vinylidene fluoride perfluoromethyl vinyl ether-tetrafluoroethylene copolymer, an ethylene-acrylic acid copolymer, an ethylene-methacrylic acid copolymer, an ethylene-methyl acrylate copolymer, and an ethylene-methyl methacrylate copolymer. Those compounds may be used individually or in combinations of two or more thereof. In addition, they may be crosslinked by $Na^+$ ions or the like.

Any electron conductive material which is chemically stable inside the battery can be used as the electrically conductive material of the negative electrode mix. Examples of suitable materials include graphite such as natural graphite (flaky graphite and the like) and artificial graphite; carbon black such as acetylene black, Ketjen black, channel black, furnace black, lamp black, and thermal black; conductive fibers such as carbon fiber and metallic fiber; metal powders such as copper and nickel; and organic conductive materials such as polyphenylene derivatives. Those materials may be used individually or in combinations of two or more thereof.

The addition amount of the electrically conductive material of the negative electrode mix is not particularly limited, and it is preferably 1% by mass to 30% by mass, more preferably 1% by mass to 10% by mass with respect to the negative electrode active material particles contained in the negative electrode mix.

Any negative electrode core material (negative electrode collector) may be used, provided that it is an electron conductive material that is chemically stable inside the battery. For example, a foil or a sheet constituted by stainless steel, nickel, copper, titanium, carbon, or a conductive resin can be used. Among them, a copper foil and a copper alloy foil are preferred. In this case, it is also possible to provide a carbon, titanium, or nickel layer, or form an oxide layer on the surface of the foil or sheet. Further, depressions and protrusions can be formed on the surface of the foil or sheet, and it is also possible to use a net, a punching sheet, a lath material, a porous material, a foamed material, or a material obtained by molding a group of fibers.

The thickness of the negative electrode core material is not particularly limited, and can be, for example, 1 µm to 500 µm.

A nonaqueous solvent having a lithium salt dissolved therein is preferred as a nonaqueous electrolytic solution.

Examples of suitable nonaqueous solvents include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; lactones such as γ-butyrolactone, γ-valerolactone; chain ethers such as 1,2-dimethoxyethane (DME), 1,2-diethoxyethane (DEE), and ethoxy methoxy ethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propylnitrile, nitromethane, ethylmonoglyme, triester phosphate, trimethoxymetane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, dimethylsulfoxide, and N-methyl-2-pyrrolidone. Those compounds may be used individually or in combinations of two or more thereof. Among them, a mixed solvent of a cyclic carbonate and a chain carbonate, and a mixed solvent of a cyclic carbonate, a chain carbonate and an aliphatic carboxylate are preferred.

Examples of suitable lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salts of lower aliphatic carboxylic acids, LiBr, LiI, chloroborane lithium, lithium tetraphenylborate, and lithium imide salts. Those salts may be used individually or in combinations of two or more thereof. It is preferred that at least $LiPF_6$ be used.

The concentration of the lithium salt in the nonaqueous solvent is not particularly limited, but is preferably 0.2 mol/L to 2 mol/L, and more preferably 0.5 mol/L to 1.5 mol/L.

A variety of additives can be added to the nonaqueous electrolytic solution to improve the charge-discharge characteristics of the battery. Examples of the additives include triethyl phosphite, triethanolamine, cyclic ethers, ethylene diamine, n-glyme, pyridine, hexaphosphoric acid triamide, nitrobenzene derivatives, crown ethers, quaternary ammonium salts, and ethylene glycol dialkyl ethers.

Further, a separator is interposed between the positive electrode and the negative electrode. The separator is preferably a microporous thin membrane having large ion permeability and a predetermined mechanical strength, as well as electric insulation ability. The microporous thin membrane preferably has a function of closing pores and increasing the electric resistance at a temperature equal to or higher than a certain temperature. It is also preferred that a polyolefin such as polypropylene and polyethylene having excellent resistance to organic solvents and hydrophobic property be used as a material for the microporous thin membrane. In addition, a sheet, nonwoven fabric, or woven fabric made of glass fiber can be also used.

A pore size of the separator is, for example, 0.01 µm to 1 µm. The separator thickness is typically 10 µm to 300 µm. A void ratio of the separator is typically at 30% to 80%.

Further, a polymer electrolyte constituted by a nonaqueous electrolytic solution and a polymer material holding the same can be also used integrally with the positive electrode or negative electrode as the separator. The polymer material is not particularly limited, provided that it is capable of holding the nonaqueous electrolytic solution, but a copolymer of vinylidene fluoride and hexafluoropropylene is particularly preferred.

EXAMPLES

The present invention will be explained below in greater detail on the basis of examples of the present invention and comparative examples, but the present invention is not limited to the examples. The following methods were used for analyzing metals in the lithium nickel composite oxides used in the examples and comparative examples and for evaluating the specific surface area.

(1) Analysis of metals was conducted by IPC emission spectrometry.

(2) Analysis of carbon was conducted by high-frequency combustion-infrared absorption method.

(3) The specific surface area was measured by a BET method.

Example 1

A positive electrode active material constituted by a lithium nickel composite oxide was produced by a series of steps including: a step for preparing a nickel hydroxide having a predetermined composition described hereinbelow, a step for preparing a fired powder having a predetermined composition, and a step for water washing the resultant fired powder and then drying, and then a coin battery was fabricated using the dried powder as a positive electrode material. The battery was evaluated by the impedance thereof.

The starting materials were weighted such that molar ratios of the metal components of the lithium nickel composite oxide were Ni:Co:Al:Li=0.82:0.15:0.03:1.02.

(1) Step for Preparing Nickel Hydroxide

Firstly, an aqueous solution was prepared by mixing nickel sulfate hexahydrate (produced by Wako Pure Chemical Industries, Ltd.), cobalt sulfate heptahydrate (produced by Wako Pure Chemical Industries, Ltd.) and aluminum sulfate (produced by Wako Pure Chemical Industries, Ltd.) at desired ratios. This aqueous solution was dropped simultaneously with ammonia water (produced by Wako Pure Chemical Industries, Ltd.) and an aqueous solution of sodium hydroxide (produced by Wako Pure Chemical Industries, Ltd.) into a stirring reaction tank equipped with a discharge outlet and filled with water warmed to 50° C. In this case, spherical nickel hydroxide constituted by aggregated primary particles was produced by a reaction crystallization method in which pH was maintained at 11.5 and a residence time was controlled to 11 hours.

(2) Step for Producing Fired Powder

Lithium hydroxide monohydrate (produced by Wako Pure Chemical Industries, Ltd.) was added to the resultant nickel hydroxide so as to attain the desired composition, and the components were mixed using a V-blender. The mixture obtained was prefired for 3 hours at 500° C. under an atmosphere with an oxygen concentration equal to or higher than 30% by using an electric furnace, and then subjected to main firing for 20 hours at 760° C. The fired product was cooled to room temperature inside the furnace and then pulverized to obtain a spherical fired powder constituted by aggregated primary particles.

(3) Step for Water Washing and Drying the Fired Powder

A slurry was prepared by adding pure water at 20° C. to the resultant fired powder so as to obtain the liquid electrical conductivity of the slurry of 45 mS/cm, and the slurry was stirred for 50 minutes and washed with water, and then filtered. The powder was taken out and allowed to stay for 10 hours using a vacuum drying machine warmed to 150° C. Then, the composition of the lithium nickel composite oxide powder and the carbon content (TC) thereof were analyzed and the specific surface area thereof was measured. The lithium nickel composite oxide was confirmed to be a single phase by powder X-ray diffraction using Cu-Kα ray. The results are shown in Table 2.

(4) Fabrication and Evaluation of Battery

A battery was fabricated by the following method by using the resultant lithium nickel composite oxide, and the internal resistance was measured by the battery impedance. The results are shown in Table 2.

[Battery Fabrication Method]

A total of 5 parts by mass of acetylene black and 5 parts by mass of polyvinylidene fluoride were mixed with 90 parts by mass of the positive electrode active material powder, and a paste was obtained by adding n-methylpyrrolidone. The paste was applied onto an aluminum foil with a thickness of 20 μm to obtain a weight of the active material after drying of 0.05 g/cm$^2$, vacuum drying was performed at 120° C., and then a disk with a diameter of 1 cm was punched out therefrom to obtain a positive electrode.

Metallic lithium was used as a negative electrode and a solution prepared by mixing ethylene carbonate (EC) and diethyl carbonate (DEC) in equal amounts and containing 1M LiClO$_4$ as a supporting electrolyte was used as an electrolytic solution. The electrolytic solution was infiltrated into a separator made of polyethylene, and a 2032-type coin battery was fabricated in a glove box under an Ar gas atmosphere controlled at a dew point of −80° C.

FIG. 1 shows a schematic structure of the 2032-type coin battery. The coin battery is composed of a positive electrode (electrode for evaluation) 1 in a positive electrode can 5, a lithium metal negative electrode 3 in a negative electrode can 6, a separator 2 infiltrated with the electrolytic solution, and a gasket 4.

[Method for Evaluation by Impedance]

The fabricated battery was allowed to stay for about 24 hours to stabilize OCV, and then CCCV charging was performed up to a voltage of 4.0 V at an initial current density of 0.5 mA/cm$^2$, relative to the positive electrode. The charged coin battery was then used to perform impedance measurements by scanning from a frequency of 10 kHz to a frequency of 0.1 Hz under a voltage condition of 10 mV. The impedance device used in this case was an impedance analyzer 1255B, manufactured by Solartron Co., Ltd.

The internal resistance value Rct shown in Table 1 was calculated from the second arc after the measurements and expressed as a relative value for which the value obtained in Example 1 was taken as 100.

[Measurement of Amount of Lithium at the Surface]

Ultra-pure water was added up to 100 ml to 10 g of the lithium nickel composite oxide powder, followed by stirring and then titration with 1 mol/L of hydrochloric acid. The measurements were conducted up to the second neutralization point. The alkali component neutralized by hydrochloric acid was assumed to be lithium on the surface of the lithium nickel composite oxide, a mass ratio of lithium to the lithium nickel composite oxide was determined from the titration result, and this value was taken as the amount of lithium at the surface. The results are shown in Table 2.

[Measurement of Gas Generation Amount at High Temperature]

The gas generation amount was measured by allowing the fabricated battery to stay in a charged state for 24 hours at a high temperature of 80° C., cutting a part of an exterior packaging of the battery, and quantitatively determining the volume of gas replaced and collected on the liquid in paraffin at 23° C. The results are shown in Table 2.

Example 2

A lithium nickel composite oxide was produced similarly as in Example 1, except that nickel oxyhydroxide obtained by further adding sodium hypochlorite and performing the oxidation treatment was used instead of nickel hydroxide obtained in (1) Step for Preparing Nickel Hydroxide of Example 1.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 3

A lithium nickel composite oxide was produced similarly as in Example 1, except that nickel hydroxide obtained in (1) Step for Preparing Nickel Hydroxide of Example 1 was oxidation roasted at 740° C. to obtain nickel oxide.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 4

A lithium nickel composite oxide was produced similarly as in Example 3, except that a mixture of aqueous solutions of starting materials was prepared by mixing nickel sulfate hexahydrate (produced by Wako Pure Chemical Industries, Ltd.), cobalt sulfate heptahydrate (produced by Wako Pure Chemical Industries, Ltd.), aluminum sulfate (produced by Wako Pure Chemical Industries, Ltd.) and magnesium sulfate heptahydrate (produced by Pure Chemical Co., Ltd.) to obtain the molar ratios Ni:Co:Al:Mg:Li=0.804:0.148:0.036:0.012:1.02 of metal components of the lithium nickel composite oxide after firing.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 5

A lithium nickel composite oxide was produced similarly as in Example 3, except that a mixture of aqueous solutions of starting materials was prepared by mixing nickel sulfate hexahydrate (produced by Wako Pure Chemical Industries, Ltd.), cobalt sulfate heptahydrate (produced by Wako Pure Chemical Industries, Ltd.), aluminum sulfate (produced by Wako Pure Chemical Industries, Ltd.) and manganese sulfate pentahydrate (produced by Pure Chemical Co., Ltd.) to obtain the molar ratios Ni:Co:Al:Mn:Li=0.786:0.151:0.035:0.028:1.02 of metal components of the lithium nickel composite oxide after firing.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 6

A lithium nickel composite oxide was produced similarly as in Example 3, except that lithium oxide was used instead of lithium hydroxide monohydrate described in Example 1.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 7

A lithium nickel composite oxide was produced similarly as in Example 3, except that the main firing temperature in the step for preparing the fired powder described in Example 1 was 700° C. Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 8

A lithium nickel composite oxide was produced similarly as in Example 3, except that the main firing temperature in the step for preparing the fired powder described in Example 1 was 800° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 9

A lithium nickel composite oxide was produced similarly as in Example 3, except that the temperature of pure water used in water washing in the step for water washing and drying the fired powder described in Example 1 was 15° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 10

A lithium nickel composite oxide was produced similarly as in Example 3, except that the temperature of pure water used in water washing in the step for water washing and drying the fired powder described in Example 1 was 30° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 11

A lithium nickel composite oxide was produced similarly as in Example 3, except that the temperature of pure water used in water washing in the step for water washing and drying the fired powder described in Example 1 was 35° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 12

A lithium nickel composite oxide was produced similarly as in Example 3, except that the temperature of pure water used in water washing in the step for water washing and drying the fired powder described in Example 1 was 12° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 13

A lithium nickel composite oxide was produced similarly as in Example 3, except that the temperature of pure water used in water washing in the step for water washing and drying the fired powder described in Example 1 was 38° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 14

A lithium nickel composite oxide was produced similarly as in Example 3, except that the temperature of pure water used in water washing in the step for water washing and drying the fired powder described in Example 1 was 10° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Example 15

A lithium nickel composite oxide was produced similarly as in Example 3, except that the temperature of pure water used in water washing in the step for water washing and drying the fired powder described in Example 1 was 40° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Comparative Example 1

A lithium nickel composite oxide was produced similarly as in Example 3, except that the temperature of pure water used in water washing in the step for water washing and drying the fired powder described in Example 1 was 0° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Comparative Example 2

A lithium nickel composite oxide was produced similarly as in Example 3, except that the temperature of pure water used in water washing in the step for water washing and drying the fired powder described in Example 1 was 50° C.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Comparative Example 3

A lithium nickel composite oxide was produced similarly as in Example 3, except that the amount of pure water added in the step for water washing and drying the fired powder described in Example 1 was adjusted and the liquid electrical conductivity of the slurry was adjusted to 70 mS/cm.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

Comparative Example 4

A lithium nickel composite oxide was produced similarly as in Example 3, except that the amount of pure water added in the step for water washing and drying the fired powder described in Example 1 was adjusted and the liquid electrical conductivity of the slurry was adjusted to 20 mS/cm.

Results of measuring the composition of the resultant powder, carbon content therein, amount of lithium at the surface, specific surface area, battery impedance, and amount of gas generated during high-temperature storage are shown in Tables 1 and 2. The lithium nickel composite oxide was confirmed to be a single phase by powder X-ray diffraction using Cu-Kα ray.

TABLE 1

| | Nickel Oxide starting material form | Chemical composition after firing | Li starting material | Firing temperature (° C.) | Water washing temperature (° C.) | Electric conductivity of filtrate (mS/cm) |
|---|---|---|---|---|---|---|
| Example 1 | Nickel hydroxide | $Li_{1.02}Ni_{0.82}Co_{0.15}Al_{0.03}O_2$ | $LiOH \cdot H_2O$ | 760 | 20 | 45 |
| Example 2 | Nickel oxyhydroxide | $Li_{1.02}Ni_{0.82}Co_{0.15}Al_{0.03}O_2$ | $LiOH \cdot H_2O$ | 760 | 20 | 45 |
| Example 3 | Nickel oxide | $Li_{1.02}Ni_{0.82}Co_{0.15}Al_{0.03}O_2$ | $LiOH \cdot H_2O$ | 760 | 20 | 45 |
| Example 4 | Nickel oxide | $Li_{1.02}Ni_{0.804}Co_{0.148}Al_{0.036}Mg_{0.012}O_2$ | $LiOH \cdot H_2O$ | 760 | 20 | 45 |
| Example 5 | Nickel oxide | $Li_{1.02}Ni_{0.786}Co_{0.151}Al_{0.035}Mg_{0.028}O_2$ | $LiOH \cdot H_2O$ | 760 | 20 | 45 |
| Example 6 | Nickel oxide | $Li_{1.02}Ni_{0.82}Co_{0.15}Al_{0.03}O_2$ | $Li_2O$ | 760 | 20 | 45 |
| Example 7 | Nickel oxide | $Li_{1.02}Ni_{0.81}Co_{0.16}Al_{0.03}O_2$ | $LiOH \cdot H_2O$ | 700 | 20 | 45 |
| Example 8 | Nickel oxide | $Li_{1.02}Ni_{0.83}Co_{0.14}Al_{0.03}O_2$ | $LiOH \cdot H_2O$ | 800 | 20 | 45 |
| Example 9 | Nickel oxide | $Li_{1.02}Ni_{0.81}Co_{0.16}Al_{0.03}O_2$ | $LiOH \cdot H_2O$ | 760 | 15 | 45 |
| Example 10 | Nickel oxide | $Li_{1.02}Ni_{0.82}Co_{0.15}Al_{0.03}O_2$ | $LiOH \cdot H_2O$ | 760 | 30 | 45 |
| Example 11 | Nickel oxide | $Li_{1.02}Ni_{0.82}Co_{0.15}Al_{0.03}O_2$ | $LiOH \cdot H_2O$ | 760 | 35 | 45 |
| Example 12 | Nickel oxide | $Li_{1.02}Ni_{0.82}Co_{0.15}Al_{0.03}O_2$ | $LiOH \cdot H_2O$ | 760 | 12 | 45 |
| Example 13 | Nickel oxide | $Li_{1.02}Ni_{0.82}Co_{0.15}Al_{0.03}O_2$ | $LiOH \cdot H_2O$ | 760 | 38 | 45 |
| Example 14 | Nickel oxide | $Li_{1.02}Ni_{0.82}Co_{0.15}Al_{0.03}O_2$ | $LiOH \cdot H_2O$ | 760 | 10 | 45 |
| Example 15 | Nickel oxide | $Li_{1.02}Ni_{0.82}Co_{0.15}Al_{0.03}O_2$ | $LiOH \cdot H_2O$ | 760 | 40 | 45 |

TABLE 1-continued

|  | Nickel Oxide starting material form | Chemical composition after firing | Li starting material | Firing temperature (° C.) | Water washing temperature (° C.) | Electric conductivity of filtrate (mS/cm) |
|---|---|---|---|---|---|---|
| Comparative Example 1 | Nickel oxide | $Li_{1.02}Ni_{0.82}Co_{0.15}Al_{0.03}O_2$ | $LiOH \cdot H_2O$ | 760 | 0 | 45 |
| Comparative Example 2 | Nickel oxide | $Li_{1.02}Ni_{0.82}Co_{0.15}Al_{0.03}O_2$ | $LiOH \cdot H_2O$ | 760 | 50 | 45 |
| Comparative Example 3 | Nickel oxide | $Li_{1.02}Ni_{0.82}Co_{0.15}Al_{0.03}O_2$ | $LiOH \cdot H_2O$ | 760 | 20 | 70 |
| Comparative Example 4 | Nickel oxide | $Li_{1.02}Ni_{0.82}Co_{0.15}Al_{0.03}O_2$ | $LiOH \cdot H_2O$ | 760 | 20 | 20 |

TABLE 2

|  | Chemical composition | Specific surface area (m²/g) | Resistance Rct (a. u.) | Initial discharge capacity (mAhg) | TC (% by mass) | Amount of lithium on surface (% by mass) | Gas generation amount at high temperature (index) |
|---|---|---|---|---|---|---|---|
| Example 1 | $Li_{0.91}Ni_{0.82}Co_{0.15}Al_{0.03}O_2$ | 2.0 | 100 | 187 | 0.02 | 0.03 | 5 |
| Example 2 | $Li_{0.91}Ni_{0.82}Co_{0.15}Al_{0.03}O_2$ | 0.83 | 99 | 187 | 0.02 | 0.03 | 5 |
| Example 3 | $Li_{0.91}Ni_{0.82}Co_{0.15}Al_{0.03}O_2$ | 1.50 | 97 | 186 | 0.02 | 0.03 | 5 |
| Example 4 | $Li_{0.912}Ni_{0.804}Co_{0.148}Al_{0.036}Mn_{0.012}O_2$ | 0.69 | 98 | 186 | 0.02 | 0.03 | 5 |
| Example 5 | $Li_{0.91}Ni_{0.786}Co_{0.151}Al_{0.035}Mn_{0.028}O_2$ | 0.64 | 101 | 186 | 0.02 | 0.03 | 5 |
| Example 6 | $Li_{0.91}Ni_{0.82}Co_{0.15}Al_{0.03}O_2$ | 0.52 | 99 | 188 | 0.02 | 0.03 | 5 |
| Example 7 | $Li_{0.91}Ni_{0.81}Co_{0.16}Al_{0.03}O_2$ | 1.50 | 130 | 177 | 0.06 | 0.08 | 5 |
| Example 8 | $Li_{0.91}Ni_{0.83}Co_{0.14}Al_{0.03}O_2$ | 0.69 | 120 | 176 | 0.06 | 0.07 | 5 |
| Example 9 | $Li_{0.91}Ni_{0.81}Co_{0.16}Al_{0.03}O_2$ | 1.12 | 98 | 188 | 0.03 | 0.04 | 7 |
| Example 10 | $Li_{0.91}Ni_{0.82}Co_{0.15}Al_{0.03}O_2$ | 1.29 | 103 | 185 | 0.02 | 0.035 | 6 |
| Example 11 | $Li_{0.91}Ni_{0.82}Co_{0.15}Al_{0.03}O_2$ | 1.49 | 109 | 185 | 0.03 | 0.04 | 7 |
| Example 12 | $Li_{0.91}Ni_{0.82}Co_{0.15}Al_{0.03}O_2$ | 1.12 | 120 | 182 | 0.05 | 0.06 | 8 |
| Example 13 | $Li_{0.91}Ni_{0.82}Co_{0.15}Al_{0.03}O_2$ | 1.52 | 115 | 182 | 0.05 | 0.06 | 8 |
| Example 14 | $Li_{0.91}Ni_{0.82}Co_{0.15}Al_{0.03}O_2$ | 1.11 | 134 | 180 | 0.07 | 0.09 | 10 |
| Example 15 | $Li_{0.91}Ni_{0.82}Co_{0.15}Al_{0.03}O_2$ | 1.56 | 120 | 180 | 0.07 | 0.09 | 10 |
| Comparative Example 1 | $Li_{0.91}Ni_{0.82}Co_{0.15}Al_{0.03}O_2$ | 1.11 | 180 | 135 | 0.09 | 0.11 | 12 |
| Comparative Example 2 | $Li_{0.91}Ni_{0.82}Co_{0.15}Al_{0.03}O_2$ | 1.67 | 150 | 160 | 0.09 | 0.11 | 12 |
| Comparative Example 3 | $Li_{1.00}Ni_{0.82}Co_{0.15}Al_{0.03}O_2$ | 0.98 | 160 | 175 | 0.09 | 0.13 | 14 |
| Comparative Example 4 | $Li_{0.84}Ni_{0.82}Co_{0.15}Al_{0.03}O_2$ | 2.10 | 175 | 130 | 0.03 | 0.03 | 5 |

It follows from Tables 1 and 2 that in Examples 1 to 13, which satisfy all of the requirements of the present invention, the resultant positive electrode active materials have a low internal resistance, a high capacity and a small amount of gas generation at a high temperature.

By contrast, in Comparatives Example 1, which does not satisfy some or all of the requirements of the present invention, since the water washing temperature is low, water washing is insufficient, the content of carbon (TC) increases, and the internal resistance increases significantly. Further, in Comparative Example 2, since the water washing temperature is high, the elution of lithium during water washing increases, the capacity decreases, and the internal resistance increases. Furthermore, in Comparative Example 3, since the liquid electrical conductivity is high and water washing is not sufficient, the content of carbon increases, internal resistance increases, and the amount of gas generation at a high temperature increases. In Comparative Example 4, since the liquid electrical conductivity is low and over-washing is performed, the elution of lithium during water washing increases, the capacity decreases, and the internal resistance increases.

INDUSTRIAL APPLICABILITY

As is clear from the above, the positive electrode active material for a nonaqueous electrolyte secondary battery in accordance with the present invention is constituted by a lithium nickel composite oxide with a small internal resistance and excellent thermal stability, and a nonaqueous electrolyte secondary battery of a high capacity and high safety can be obtained by using such a positive electrode active material. Further, the nonaqueous electrolyte secondary battery using the positive electrode active material in accordance with the present invention is advantageous as a rechargeable secondary battery to be used in the field of small electronic devices and has very high industrial applicability.

REFERENCE SIGNS LIST 1 positive electrode (electrode for evaluation)
2 separator (impregnated with electrolytic solution)
3 metallic lithium negative electrode
4 gasket
5 positive electrode case
6 negative electrode case

What is claimed is:

1. A method for manufacturing a positive electrode active material for a nonaqueous electrolyte secondary battery, the method comprising:
  (a) a step for preparing a fired powder of a lithium nickel composite oxide represented by the following composition formula (3):

Composition formula: $Li_bNi_{1-a}M1_aO_2$ (3)

(where M1 represents at least one element selected from transition metal elements other than Ni, elements of the second group of the Periodic System and elements of the thirteenth group of the Periodic System; a satisfies the condition $0.01 \leq a \leq 0.5$; and b satisfies the condition $0.95 \leq b \leq 1.13$) by mixing at least one nickel compound selected from a nickel hydroxide including nickel as a main component and at least one element selected from other transition metal elements, elements of the second group of the Periodic System, and elements of the thirteenth group of the Periodic System as an auxiliary component, a nickel oxyhydroxide thereof, and a nickel oxide obtained by roasting thereof, and a lithium compound, and then firing the mixture at a maximum temperature in a range of 650° C. to 850° C. under oxygen atmosphere; and
  (b) a step for preparing a lithium nickel composite oxide powder by mixing the fired powder with water to obtain a slurry, washing the fired powder with water at a temperature of 10° C. to 40° C., while controlling an electrical conductivity of a liquid portion of the slurry to be in a range of 30 mS/cm to 60 mS/cm, then filtering and drying the resultant fired powder.

2. The method according to claim 1, wherein in the step (b), the fired powder after water washing treatment is dried under a gas atmosphere including no compound component containing carbon, or under a vacuum atmosphere.

3. The method according to claim 1, wherein the nickel hydroxide is prepared by dropping an aqueous solution of a metal compound including nickel as a main component and at least one element selected from other transition metal elements, elements of the second group of the Periodic System, and elements of the thirteenth group of the Periodic System as an auxiliary component, and an aqueous solution including an ammonium ion supplying substance into a heated reaction tank, and dropping, in this process, an aqueous solution of an alkali metal hydroxide in an amount necessary to maintain a reaction solution in an alkaline state.

4. The method according to claim 1, wherein the nickel oxyhydroxide is prepared by dropping an aqueous solution of a metal compound including nickel as a main component and at least one element selected from other transition metal elements, elements of the second group of the Periodic System, and elements of the thirteenth group of the Periodic System as an auxiliary component, and an aqueous solution including an ammonium ion supplying substance into a heated reaction tank, dropping, in this process, an aqueous solution of an alkali metal hydroxide in an amount necessary to maintain a reaction solution in an alkaline state, and then adding an oxidizing agent.

5. The method according to claim 1, wherein the lithium compound is at least one selected from the group consisting of lithium hydroxide, oxyhydroxide, oxide, carbonate, nitrate, and halides.

6. The method according to claim 1, wherein in step (a), a mixing ratio of the nickel compound and lithium compound is 0.95 to 1.13 as a molar ratio of a lithium amount in the lithium compound to a total amount of nickel, other transition metal elements, elements of the second group of the Periodic System, and elements of the thirteen group of the Periodic System in the nickel oxide.

7. The method according to claim 1, wherein the manufactured positive electrode active material comprises a lithium nickel composite oxide represented by the following general formula (1):

General formula: $Li_bNi_{1-a}M1_aO_2$ (1)

(where M1 represents at least one element selected from transition metal elements other than Ni, elements of the second group of the Periodic System and elements of the thirteenth group of the Periodic System; a satisfies the condition $0.01 \leq a \leq 0.5$; and b satisfies the condition $0.85 \leq b \leq 1.05$), wherein
  a specific surface area is 0.5 m²/g to 2.05 m²/g and a content of carbon in the lithium nickel composite oxide is a value equal to or less than 0.08% by mass of a total mass of the lithium nickel composite oxide,
  wherein a total content of lithium present on a surface of the lithium nickel composite oxide is a value equal to or less than 0.05% by mass of a total mass of the lithium nickel composite oxide, the total content of lithium being determined based on lithium compounds present on the surface of the lithium nickel composite oxide, the lithium compounds comprising at least lithium hydroxide and lithium carbonate,
  wherein the total content of lithium present on the surface is a mass ratio of lithium to lithium nickel composite oxide as defined by adding the lithium nickel composite oxide to a solution to obtain a slurry, determining an amount of an alkali fraction by titrating a pH of the slurry with an acid, under an assumption that an amount of lithium compounds present on the surface corresponds to the amount of the total alkali fraction in the slurry, and recalculating the amount of the lithium compounds into the total content of lithium present on the surface, and
  wherein the lithium nickel composite oxide is represented by the following general formula (2):

General formula: $Li_bNi_{1-x-y-z}Co_xAl_yM2_zO_2$ (2)

in which M2 is at least one element selected from the group consisting of Mn, Ti, Ca, and Mg; b satisfies the condition $0.85 \leq b \leq 1.05$; x satisfies the condition $0.05 \leq x \leq 0.30$; y satisfies the condition $0.01 \leq y \leq 0.1$; and z satisfies the condition $0 \leq z \leq 0.05$.

8. The method according to claim 7, wherein the content of carbon is 0.01% by mass to 0.04% by mass of the total mass of the lithium nickel composite oxide.

9. The method according to claim 7, wherein the acid is at least one acid selected from the group consisting of hydrochloric acid, sulfuric acid, nitric acid, and organic acids.

* * * * *